E. RICHTER.
POTATO PLANTER.
APPLICATION FILED APR. 21, 1910.
972,919.
Patented Oct. 18, 1910.
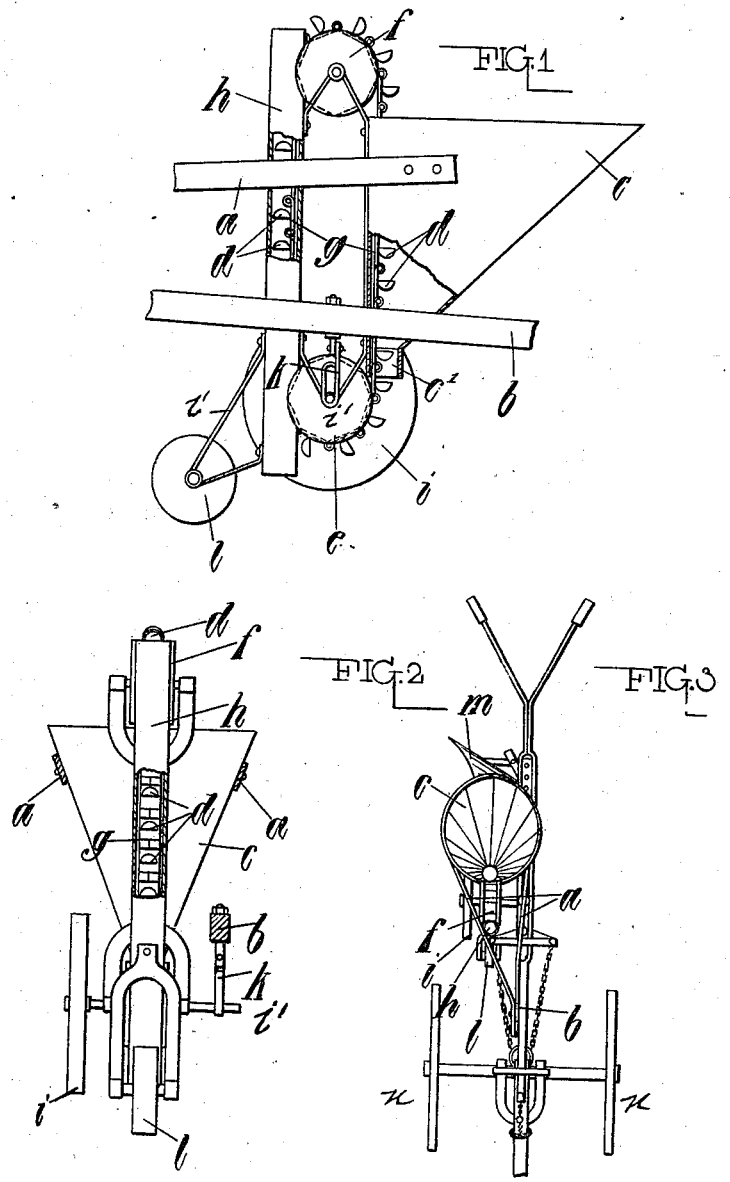
Witnesses:
Anton W. Selander.
Dr. H. L. Sherwood
Inventor:
Emil Richter
by F. Dittmar
Attorney.

UNITED STATES PATENT OFFICE.

EMIL RICHTER, OF MEHLTHENER, GERMANY.

POTATO-PLANTER.

972,919.  Specification of Letters Patent. Patented Oct. 18, 1910.

Application filed April 21, 1910. Serial No. 556,669.

*To all whom it may concern:*

Be it known that I, EMIL RICHTER, subject of the Emperor of Germany, residing at Mehlthener, in the Kingdom of Saxony, Germany, have invented certain new and useful Improvements in Potato-Planters, of which the following is a specification, reference being had therein to the accompanying drawing.

This invention relates to an implement for planting potatoes, has for its object a cheap and efficient device for the purpose, and consists in certain improvements in construction which will be fully disclosed in the following specification and claim.

In the accompanying drawing which forms part of the specification—Figure 1 represents a side view partly in section illustrating part of an implement embodying my invention. Fig. 2 is a front view, and Fig. 3 is a plan view on a reduced scale.

Reference being had to the drawing and the designating characters thereon, $c$ indicates a hopper for holding potatoes to be planted, is secured to the beam $b$ by means of struts $a$, and the hopper is provided with an opening $c'$ at its lower end through which the elevator passes. The elevator comprises an endless chain $g$ to which cups $d$ are secured, and the chain passes over drums $e$, $f$, one above, the other below the hopper, and is propelled by a wheel $i$ secured to the shaft $i'$, which extends through and supports the drum $e$, the free end of said shaft being supported in a bracket $k$ secured to the beam $b$.

The elevator with its cups fits the opening $c'$ in the hopper snugly so that no potatoes can fall through the opening, but must fall into the cups $d$ and are carried by them to the drop-tube $h$, whose lower end extends down directly over the furrows, which have been previously formed, into which the potatoes drop at intervals corresponding to the velocity of the elevator.

The wheel $i$ is detachably secured to the shaft $i'$ and is interchangeable with other wheels of different diameter for the purpose of regulating the space of distance between the potatoes to be planted, by the speed or velocity given to the chain $g$.

A roller $l$, supported in a bracket $l'$ secured to the front of the tube $h$ presses manure or other fertilizer into the furrow and forms an even bed or bottom of the furrow, thus securing a regular depth to the potatoes being planted, and in the rear of the hopper, attached to the beam $b$ is a share or coverer $m$ for closing the furrows after the potatoes have been dropped into the furrows.

The planter is supported on wheels $n$, $n$, and is manipulated in the usual manner of operating this class of implements.

Having thus fully described my invention, what I claim is:

A potato planter comprising a hopper having an opening in its lower end, a tube adjacent to the hopper, an endless conveyer extending through the hopper and into said tube, a drive wheel supported on the shaft of the lower drum of the conveyer for propelling the conveyer and adapted for varying the spacing of the potatoes, a bracket connected to the beam of the plow for supporting one end of said shaft, a roller in front of the drop-tube adapted to press a fertilizer in and level the bottom of a furrow, and a share in line with and in rear of said tube for closing the furrow and covering the potatoes.

In testimony whereof I affix my signature.

EMIL RICHTER.

In the presence of—
  J. ALPHORN,
  CHARLES NEUER.